(12) United States Patent
Zhu

(10) Patent No.: US 7,958,177 B2
(45) Date of Patent: Jun. 7, 2011

(54) METHOD OF PARALLELLY FILTERING INPUT DATA WORDS TO OBTAIN FINAL OUTPUT DATA WORDS CONTAINING PACKED HALF-PEL PIXELS

(75) Inventor: Hong-Bo Zhu, Shanghai (CN)

(73) Assignee: Arcsoft, Inc., Fremont, CA (US)

( * ) Notice: Subject to any disclaimer, the term of this patent is extended or adjusted under 35 U.S.C. 154(b) by 1184 days.

(21) Appl. No.: 11/605,259

(22) Filed: Nov. 29, 2006

(65) Prior Publication Data

US 2008/0123974 A1    May 29, 2008

(51) Int. Cl.
*G06F 17/17* (2006.01)
*G06F 7/38* (2006.01)
*G06K 9/32* (2006.01)

(52) U.S. Cl. .......... 708/313; 708/552; 382/300

(58) Field of Classification Search ........ 345/501; 382/298–300; 708/552, 300, 313; 375/240.15–240.17
See application file for complete search history.

(56) References Cited

U.S. PATENT DOCUMENTS

| | | | | |
|---|---|---|---|---|
| 5,627,966 A * | 5/1997 | Hanko | ............... | 714/49 |
| 5,801,977 A * | 9/1998 | Karp et al. | ............... | 708/552 |
| 5,815,164 A * | 9/1998 | Howell | ............... | 345/501 |
| 5,896,307 A * | 4/1999 | Volkonsky | ............... | 708/552 |
| 5,953,457 A * | 9/1999 | Tucker et al. | ............... | 382/233 |
| 7,275,147 B2 * | 9/2007 | Tavares | ............... | 712/224 |
| 7,778,494 B2 * | 8/2010 | Shastry et al. | ............... | 382/300 |
| 2007/0070080 A1 * | 3/2007 | Graham et al. | ............... | 345/589 |
| 2008/0166068 A1 * | 7/2008 | Fuchigami | ............... | 382/300 |

OTHER PUBLICATIONS

Sinan Yalcin and Ilker Hamzaoglu, "A High Performance Hardware Architecture for Half-Pixel Accurate H.264 Motion Estimation", 14th IFIP International Conference on VLSI-SoC, Oct. 2006.*

Wiegand, T.; Sullivan, G.J.; Bjontegaard, G.; Luthra, A.; , "Overview of the H.264/AVC video coding standard," IEEE Transactions on Circuits and Systems for Video Technology, vol. 13, No. 7, pp. 560-576, Jul. 2003.*

C.-B. Sohn and H.-J. Cho, "An Efficient SIMD-based Quarter-Pixel Interpolation Method for H.264/AVC," International Journal of Computer Science and Security, vol. 6, No. 11, Nov. 2006, pp. 85-89.*

* cited by examiner

*Primary Examiner* — Lewis A Bullock, Jr.
*Assistant Examiner* — Matthew Sandifer
(74) *Attorney, Agent, or Firm* — Bacon & Thomas, PLLC

(57) ABSTRACT

The present invention is to provide a parallel filtering method, which is implemented to an interpolation filter and comprises the steps of separating coefficients of the interpolation filter into two sets comprising the positive and negative coefficients respectively for parallelly filtering a plurality of input data pixels packed into data words inputted to the interpolation filter concurrently to obtain a first result data word, and clipping and shifting the first result data word to obtain a final output data word containing packed half-pel pixels for parallelly and efficiently filtering data stream of video without increasing the complexity, cost, size and power consumption of circuitry of an electronic video apparatus.

1 Claim, 15 Drawing Sheets

| G | a | b | c | H |
|---|---|---|---|---|
| d | e | f | g |   |
| h | i | j | k | m |
| n | p | q | r |   |
| M |   | s |   | N |

METHOD OF PARALLELLY FILTERING INPUT DATA WORDS TO OBTAIN FINAL OUTPUT DATA WORDS CONTAINING PACKED HALF-PEL PIXELS

FIELD OF THE INVENTION

The present invention relates to a parallel filtering method, more particularly to a method of parallelly filtering input data words containing a plurality of packed input data pixels to obtain final output data words containing packed half-pel pixels, in order to efficiently decrease the decoding cycles and increase the filtering speed of an interpolation filter for decoding the input data words.

PRIOR ART

A typical 'real world' or natural video scene is composed of multiple objects each with their own characteristic shape, depth, texture and illumination, of which the color and brightness is changed along with varying degrees of smoothness throughout the scene. Generally speaking, a visual scene is spatially and temporally continuous, digital video is a representation of a natural visual scene, sampled spatially and temporally. A scene is sampled at a point in time to produce a frame, which represents a complete visual scene at that point in time. The most common format for a sampled frame is a rectangle with the sampling points positioned on grids at the rectangular frame, so the visual quality of the frame is influenced by the number of sampling points. Choosing a coarse sampling grid produces a low-resolution sampled image whilst increasing the number of sampling points will produce a high-resolution image. A moving video is produced by taking rectangular 'snapshots' 10, 11, and 12 of the images at periodic time intervals (e.g. $\frac{1}{25}$ or $\frac{1}{30}$ second intervals) as shown in FIG. 1. The illusion of motion is created by displaying the frames one after the other at a relatively fast frame rate, for example, 25 or 30 frames per second. A higher temporal sampling rate gives apparently smoother motion in the video scene but requires more frames to be captured and stored.

A monochrome image requires just one number to represent the illumination of a spatial sample. But a color image requires at least three numbers per pixel to represent color accurately. The most common used color model is the YUV color model. The Y component represents the intensity of the image, while the U and V components represent the color differences of the image. Since the human visual system is more sensitive to intensity variations than color variations, the chrominance components (U, V) are spatially downsampled by a factor of 2 in the x and y directions. Typically, a block of 16×16 image pixels (macroblock) comprise a 16×16 luminance block and two 8×8 chrominance blocks.

A PAL-based format image in CIF (Common Intermediate Format) comprises 22×18 macroblocks, each macroblock has 16×16 image pixels. Since the luminance and chrominance components are represented with 8 bit resolution (in range 0-255), the number of bits needed to represent a video frame in CIF format is 22×18×(16×16+2×8×8)×8=1216512 bits. If the video is with 30 frames per second, the data rate will be 1216512×30=36495360 bps. It is an extremely high data rate and is not practical for video recording, transmission and display applications because of the very large storage capacity, transmission channel capacity and hardware performance requirements.

Modern video compression standards, such as ITU-T (Telecommunication Standardization Sector of the International Telecommunication Union) recommendations H.261, H.263, H.264 and the Motion Picture Experts Group recommendations MPEG-1, MPEG-2 and MPEG-4, are all belonging to block-based motion compensation (MC)/discrete cosine transform (DCT) hybrid video coding standard, wherein the motion compensation exploits the temporal redundancy and the DCT exploits the spatial redundancy. Referring to FIG. 2, it shows a typical MC/DCT hybrid video encoder for splitting each picture into macroblocks, which will be coded sequentially in a raster scan order. The first picture of a video sequence is typically coded in intra mode, which typically uses some prediction from region to region within the picture but has no dependence on other pictures. For all remaining pictures, typical inter-picture coding modes are used for most macroblocks. Firstly, the motion compensation module 20 or the intra prediction module 21 generates several blocks as the prediction of the current macroblock. The motion estimation module 22 selects blocks from the reconstructed frames except the reconstructed part of the current coded frame, the displacement vector is called motion vector. While the intra prediction module 21 selects blocks only from the reconstructed part of the current coded frame, and the selected prediction method is called intra-prediction mode. The difference between a current frame and a prediction frame is transformed by a frequency transform (as referring to FIG. 2, a DCT or integer-approximated DCT transform 23 is used to concentrate the energy). The transform coefficients are then scaled, quantized, entropy coded and transmitted together with the prediction side information and some control information. The quantized transform coefficients are then inv-quantized, inv-transformed to obtain the reconstructed residual. The reconstructed residual is added to the prediction to obtain the reconstructed macroblock, which will be used as the prediction for the macroblocks to be coded in future.

Referring to FIG. 3, it shows a typical MC/DCT hybrid video decoder, which is an inverse of the encoder shown in FIG. 2. Firstly, the entropy decoding module 40 decodes the macroblock mode, motion vector, prediction mode, coded block pattern, DCT coefficients etc. from the bitstream. The DCT coefficients are inv-quantized and inv-DCT to form the reconstructed residual. The prediction block is obtained according to the macroblock mode, motion vector and prediction mode. The reconstructed residual is added to the prediction block to form the reconstructed macroblock. The reconstructed macroblock is stored to the picture buffer as the prediction for the macroblock decoded in future. When all macroblocks in a picture are decoded, the reconstructed picture is outputted for display.

Since the motion of real scene is continuous, the motion vector can be any real number. However, due to the rate-distortion consideration, the accuracy of motion vector is restricted to ½ or ¼ pixel accuracy. In MPEG-2, MPEG-4 simple profile and H.263, the motion vector is restricted to ½ pixel accuracy. In H.264 and MPEG-4 advanced simple profile, the motion vector is restricted to ¼ pixel accuracy. An example of the sub-pixel prediction is shown in FIG. 4, where the current block 40 includes 5×5 integer-pel pixels in circular shape without having any sub-pixel, the prediction block 41 includes 5×5 integer-pel pixels in circular shape and 4×4 quarter-pel pixels in rectangular shape with motion vector (0.5,0), the prediction block 42 includes 5×5 integer-pel pixels in circular shape and 4×4 quarter-pel pixels in rectangular shape with motion vector (0.25,0.5) and the prediction block 43 includes 5×5 integer-pel pixels in circular shape and 4×4 quarter-pel pixels in rectangular shape with motion vector (0.5,0.5). The differences between the current block and each prediction block will be transformed, quantized and entropy coded. In view of the blocks shown above, it is easy to know that, when there isn't any sub-pel pixel existing in a block, the sub-pel pixel can be calculated from the integer-pel pixels within the block by using an interpolation filter.

In sub-pel interpolation in video coding, Finite Impulse Response (FIR) filter operations are commonly used as an important type of digital computation or processing, where data values to be processed are packed together within the memory of the data processing system in an abutting manner, and are limited to values in the range 0-255. FIR filters can be very demanding on digital processing systems because of numerous sub-pixel interpolation computations are necessary. In H.264 interpolation filter, the filter coefficients are $\{1, -5, 20, 20, -5, 1\}$. In MPEG-4 ASP interpolation filter, the coefficients are $\{-1, 3, -6, 20, 20, -6, 3, -1\}$. In VC-1 interpolation filter, the coefficients are $\{-1, 9, 9, -1\}$. All of them can be implemented with 16-bit precision exactly. Referring to FIG. 5, it illustrates eight pixel values a0, a1, a2, a3, a4, a5, a6 and a7, the half-pel pixel b can be computed as follows by using the H.264 interpolation filter:

$$tmp = (a1 + a6 - 5 \times (a2 + a5) + 20 \times (a3 + a4) + 16) >> 5$$

$$b = \text{clip0\_255}(tmp)$$

$$\text{clip0\_255}(x) = \begin{cases} 0 & x < 0 \\ x & 0 \leq x \leq 255 \\ 255 & x > 255 \end{cases},$$

in which the constant 16 is the rounding offset, and the constant 5 is the scaling factor. When a0, a1, a2, ... a7 are limited to the range 0-255, the intermediate value tmp will be in the range [−80, 335].

Again referring to FIG. 6, if using the MPEG-4 ASP interpolation filter, the half-pel pixel b can be computed as follows:

$$tmp=(20\times(a3+a4)-6\times(a2+a5)+3\times(a1+a6)-a0-a7+16) >>5$$

$$b=\text{clip0\_255}(tmp),$$

wherein the intermediate value tmp will be in the range [−112, 367]. When the result is within the range [0, 255], the most significant bit (MSB) of the tmp is no more than the most significant bit of the result plus 1.

In addition, in the MPEG-1, MPEG-2, H.263 and MPEG-4 Simple Profile, the motion vector is restricted to ½-pel accuracy, the half-pel pixels are calculated from the integer-pel pixels by using the bilinear filter. For example, referring to FIG. 6, it shows a block having four integer-pel pixels a, b, c and d in circular shape and three half-pel pixels in rectangular shape A, B and C, wherein the half-pel pixels A, B and C are calculated by using a bilinear interpolation filter as follows:

$$A=(a+b+1)>>1, B=(a+c+1)>>1, C=(a+b+c+d+2)>>2.$$

In H.264 interpolation filter, ¼-pel accuracy motion vector is used as referring to FIG. 7, which illustrates a block having four integer-pel pixels G, H, M and N, five half-pel pixels b, h, m, s and j, and twelve quarter-pel pixels a, c, d, e, f, g, i, k, n, p, q and r, wherein the half-pel pixels are calculated by using a six-tap interpolation filter (1/32, −5/32, 20/32, 20/32, −5/32, 1/32), while the quarter-pel pixels are calculated by using the bilinear filter. As shown in FIG. 7, the half-pel pixels b, h and j are calculated as follows:

$$b_1 = E - 5 \times F + 20 \times G + 20 \times H - 5 \times I + J$$

$$b = \text{clip0\_255}((b_1 + 16) >> 5)$$

$$h_1 = A - 5 \times C + 20 \times G + 20 \times M - 5 \times R + T$$

$$h = \text{clip0\_255}((h_1 + 16) >> 5)$$

$$\text{clip0\_255}(x) = \begin{cases} 0 & x < 0 \\ x & 0 \leq x \leq 255 \\ 255 & x > 255 \end{cases}$$

$$j_1 = cc - 5 \times dd + 20 \times h_1 + 20 \times m_1 - 5 \times ee + ff \text{ or}$$

$$j_1 = aa - 5 \times bb + 20 \times b_1 + 20 \times s_1 - 5 \times gg + hh$$

$$j = \text{clip0\_255}((j_1 + 512) >> 10),$$

in which the intermediate values denoted as aa, bb, $s_1$, gg and hh are derived by using the same manner as the derivation of $b_1$. Similarly, the intermediate values cc, dd, $m_1$, ee and ff are derived by using the same manner as the derivation of $h_1$. If the integer-pel pixels are within the range [0, 255], the intermediate values $b_1$ and $h_1$ will be in range [−80, 335].

In H.264 interpolation filter, as referring to FIG. 8, the quarter-pel pixels labeled as a, c, d, n, f, i, k, q, e, g, p and r are derived by using a bilinear filter as follows:

$$a=(G+b+1)>>1$$

$$c=(H+b+1)>>1$$

$$d=(G+h+1)>>1$$

$$n=(M+h+1)>>1$$

$$f=(b+j+1)>>1$$

$$i=(h+j+1)>>1$$

$$k=(j+m+1)>>1$$

$$q=(j+s+1)>>1$$

$$e=(b+h+1)>>1$$

$$g=(b+m+1)>>1$$

$$p=(h+s+1)>>1$$

$$r=(m+s+1)>>1$$

In the MPEG-4 Advanced Simple Profile (ASP), a 8-tap interpolation filter (−1/32, 3/32, −6/32, 20/32, 20/32, −6/32, 3/32, −1/32) is used to derive the half-pel pixels while the derivation of quarter-pel pixels uses the same method as the derivation of the half-pel pixels in MPEG-2. As shown in FIG. 9, the half-pel pixels a, j and i are derived as follows:

$$a=\text{clip0\_255}((-A+3\times B-6\times C+20\times D+20\times E-6\times F+3-G-H)>>5)$$

$$j=\text{clip0\_255}((-O+3\times N-6\times M+20\times L+20\times D-6\times I+3\times J-K)>>5)$$

$$i=\text{clip0\_255}((-d+3\times c-6\times b+20\times a+20\times e-6\times f+3\times g-h)>>5)$$

As mentioned above, since there are big amount of pixels in video, the interpolation filter in a video encoder or a video decoder will inevitably take a considerable time in filtering the video. For example, typically, the interpolation filter requires 43% of the total decoding cycles in the H.264 decoder. A known technique for efficient filtering is "single instruction multiple data" (SIMD) instructions. These special purpose instructions efficiently allow multiple pixel values to be packed within a data word and process them concurrently. However, the SIMD instructions occupies bit space within the instruction bit space of the data processing apparatus concerned and requires the provision of extra circuitry, which occupies valuable resource of the instruction bit space within data processing system architecture and increases the complexity, cost, size and power consumption of the circuitry of data processing apparatus, causing this technique not suitable to be implemented to a variety of electronic video apparatuses. In fact, many micro-processors embedded in the electronic video apparatuses do not even have SIMD instructions.

SUMMARY OF THE INVENTION

In view of the foregoing shortcomings of the prior art, the inventor of the present invention based on years of experience to conduct extensive researches and experiments and finally invented a method of parallelly filtering input data words containing a plurality of packed input data pixels to obtain final output data words containing packed half-pel pixels so as to efficiently filter data stream of video displaying on an electronic video apparatus without occupying valuable resource of the instruction bit space and increasing the complexity, cost, size and power consumption of the circuitry of the electronic video apparatus.

A primary objective of the present invention is to provide the method implemented to an interpolation filter and comprises the steps of separating coefficients of the interpolation filter into two sets comprising the positive and negative coefficients respectively for parallelly filtering a plurality of input data pixels packed into data words inputted to the interpolation filter concurrently so as to obtain a first result data word; and clipping and shifting the first result data word to obtain a final output data word containing packed half-pel pixels.

Another objective of the present invention is to provide the method further comprising the step of multiplying the input data words with absolute values of positive and negative coefficients respectively; accumulating all the data words multiplied by the absolute values of the positive coefficients to produce a first intermediate data word, and adding a first constant data word to the first intermediate data word to obtain a second intermediate data word; accumulating all data words multiplied by the absolute values of the negative coefficients to obtain a third intermediate data word; subtracting the third intermediate data word from the second intermediate data word for obtaining the first result data word.

Another objective of the present invention is to provide the method further comprising the step of performing a first AND logical operation between the first result data word and a second constant data word to obtain a fourth intermediate data word; and calculating the final output data words according to whether the fourth intermediate data word is equal to 0x80008000.

Still another objective of the present invention is to provide the method, when the fourth intermediate data word is equal to 0x80008000, further comprising the step of performing a second AND logical operation between 0x00ff00ff and the first result data word right shifting by a first predetermined bit position to obtain the final output data words.

Still another objective of the present invention is to provide the method, when the fourth intermediate data word isn't equal to 0x80008000, further comprising the steps of performing a third AND logical operation between the first result data word and 0x80008000 to obtain a fifth intermediate data word; subtracting the fifth intermediate data word right shifting by a second predetermined bit position from the fifth intermediate data word to obtain a first mask data word; performing a fourth AND logical operation between the first mask data word and the first result data word to obtain a second result data word; performing a fifth AND logical operation between the second result data word and the third constant data word to obtain a sixth intermediate data word; subtracting the sixth intermediate data word right shift by a third predetermined bit position from the sixth intermediate data word to obtain a second masking data word; and performing an OR logical operation between the second masking data word and the second result data word and then right shift the result thereof by a fourth predetermined bit position to obtain the final output data word.

To make it easier for our examiner to understand the objective of the invention, its structure, innovative features, and performance, we use a preferred embodiment together with the attached drawings for the detailed description of the invention.

BRIEF DESCRIPTION OF THE DRAWINGS

Figure 7:
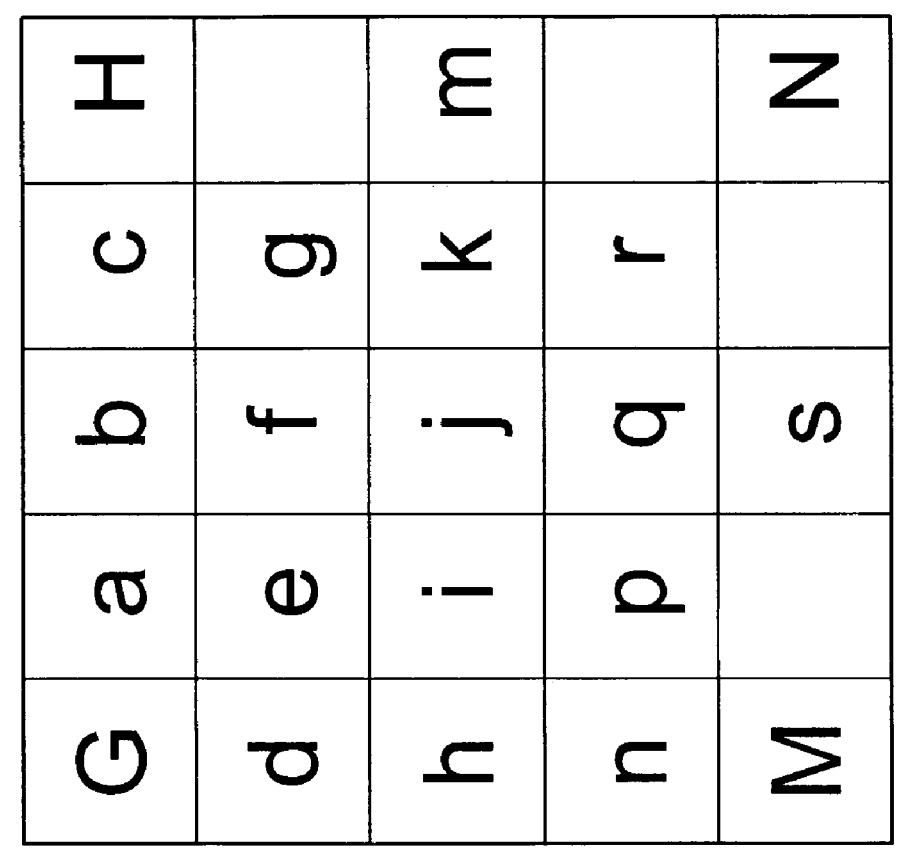

FIG. 7 is a schematic view of integer pixels and fractional pixels for quarter sample interpolation;

Figure 8:
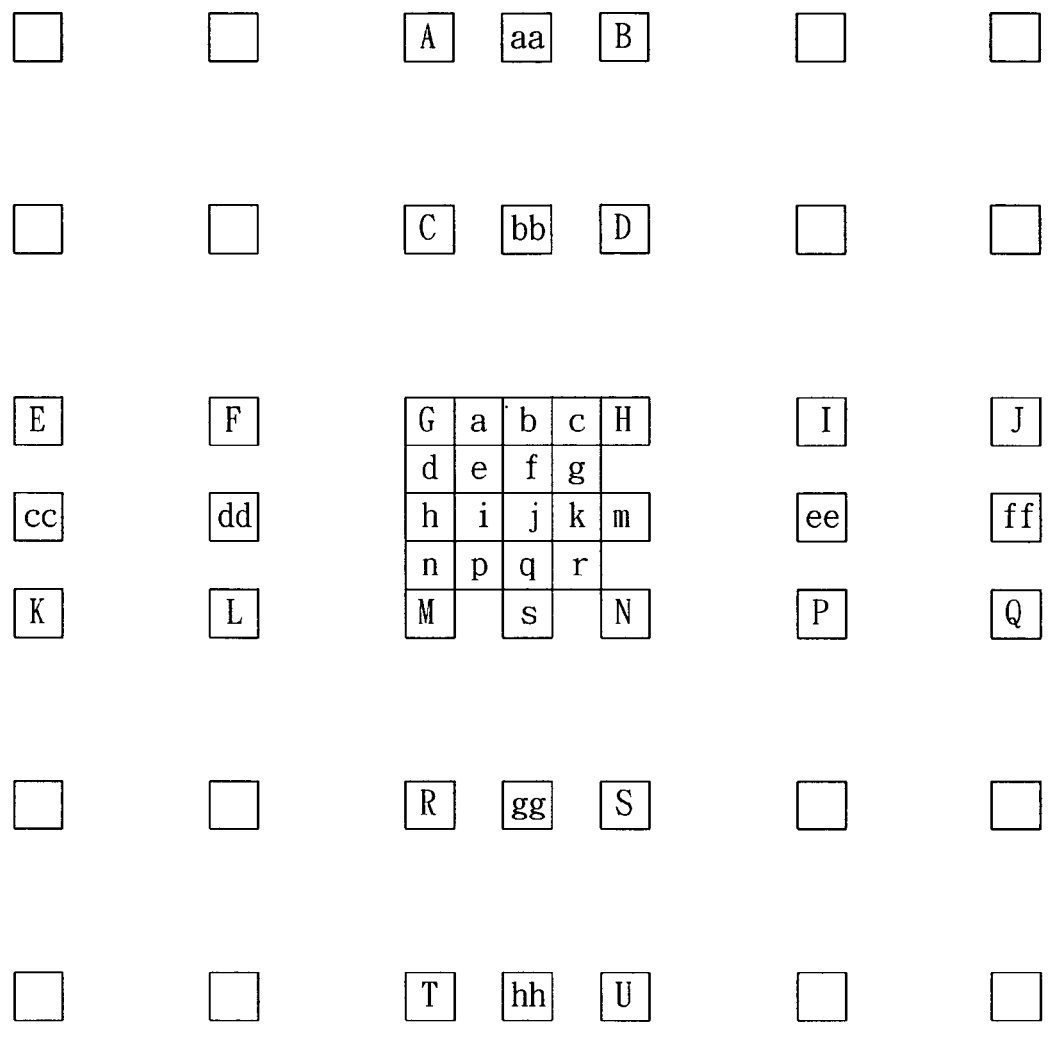

FIG. 8 is a schematic view of integer pixels and fractional pixels for H.264 interpolation filter;

Figure 9:
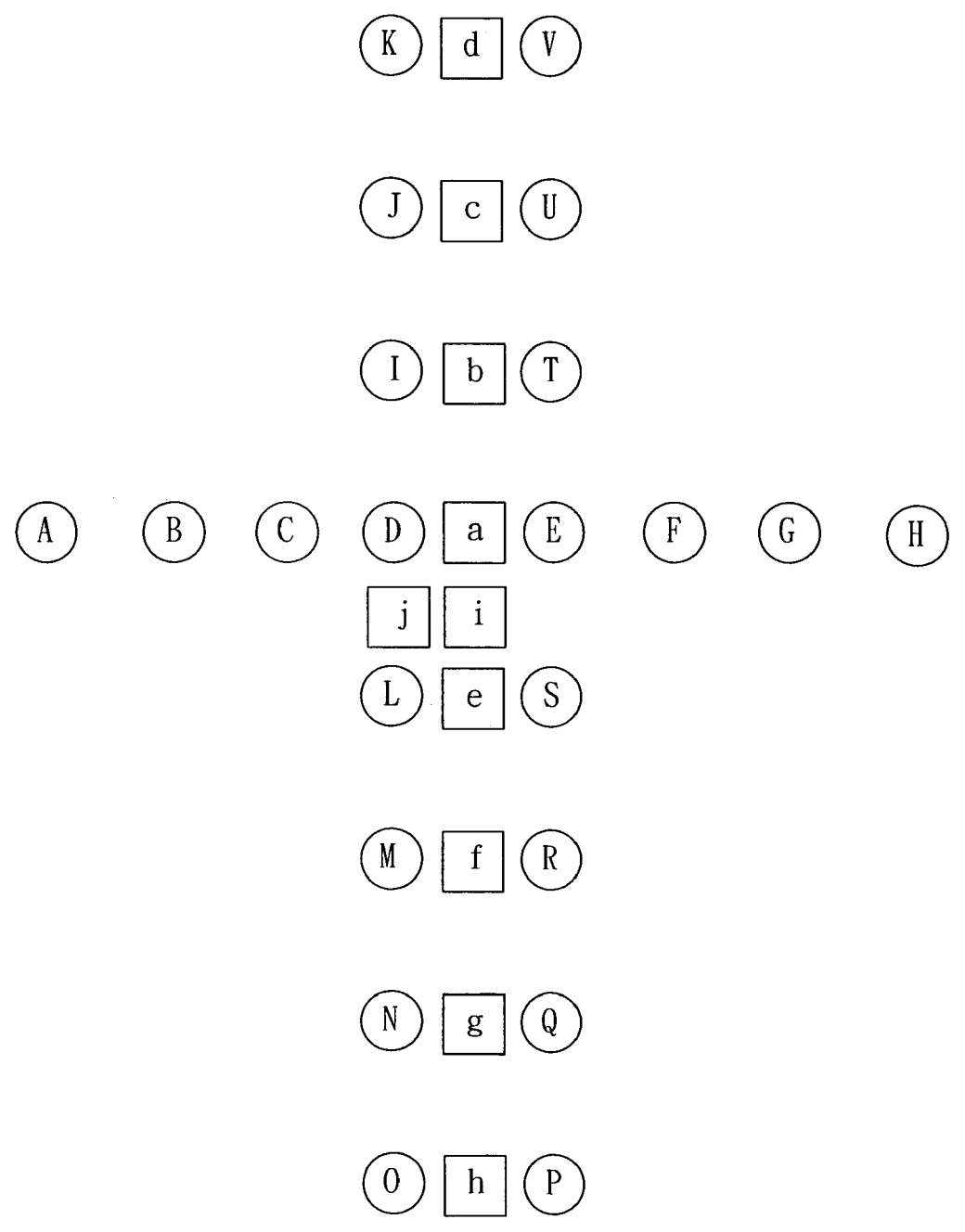

FIG. 9 is a schematic view of integer pixels and fractional pixels for MPEG-4 half-pel interpolation filter;

DETAILED DESCRIPTION OF THE PREFERRED EMBODIMENTS

Figure 1:
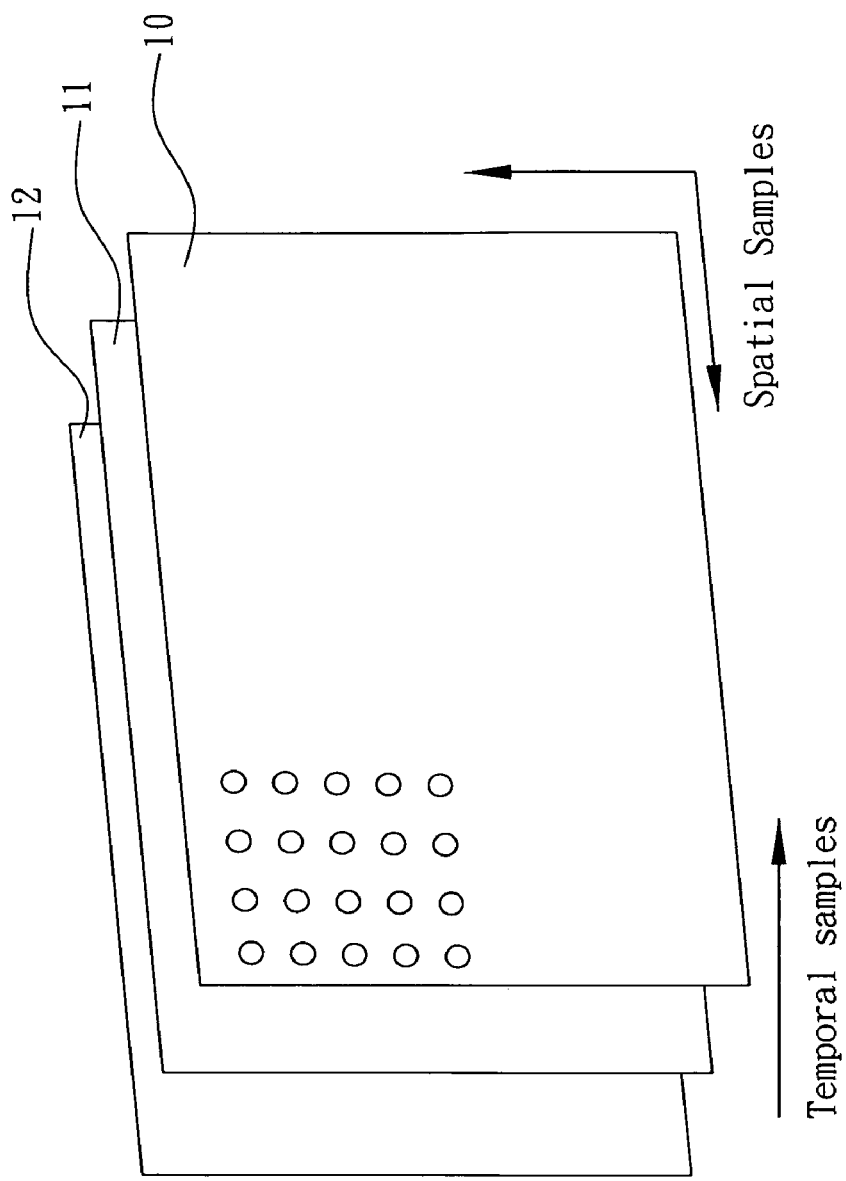
FIG. 1 is a schematic view of frames of digital video by temporally and spatially sampling natural scene.
Figure 2:
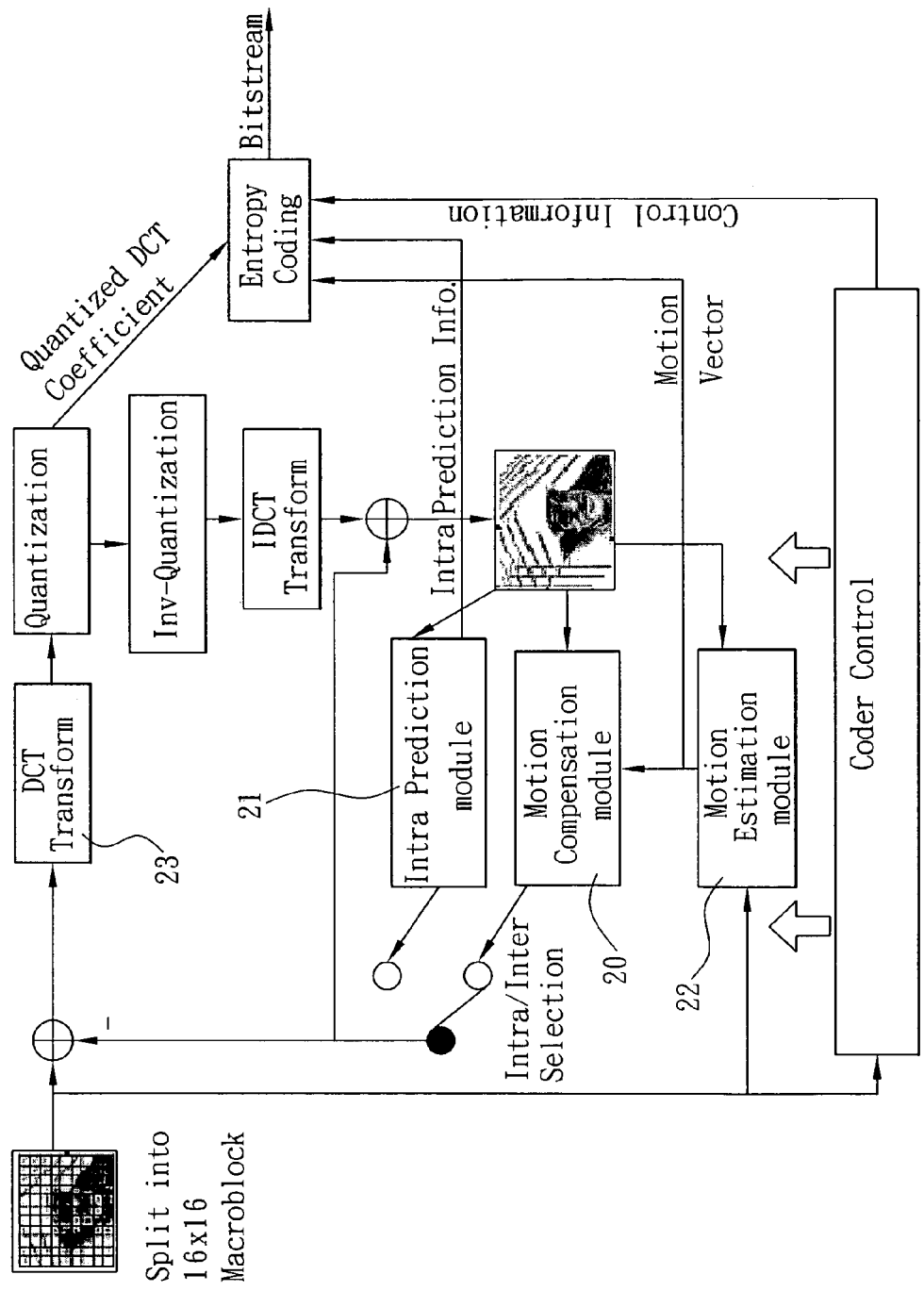
FIG. 2 is a block diagram of a MC/DCT video encoder.
Figure 3:
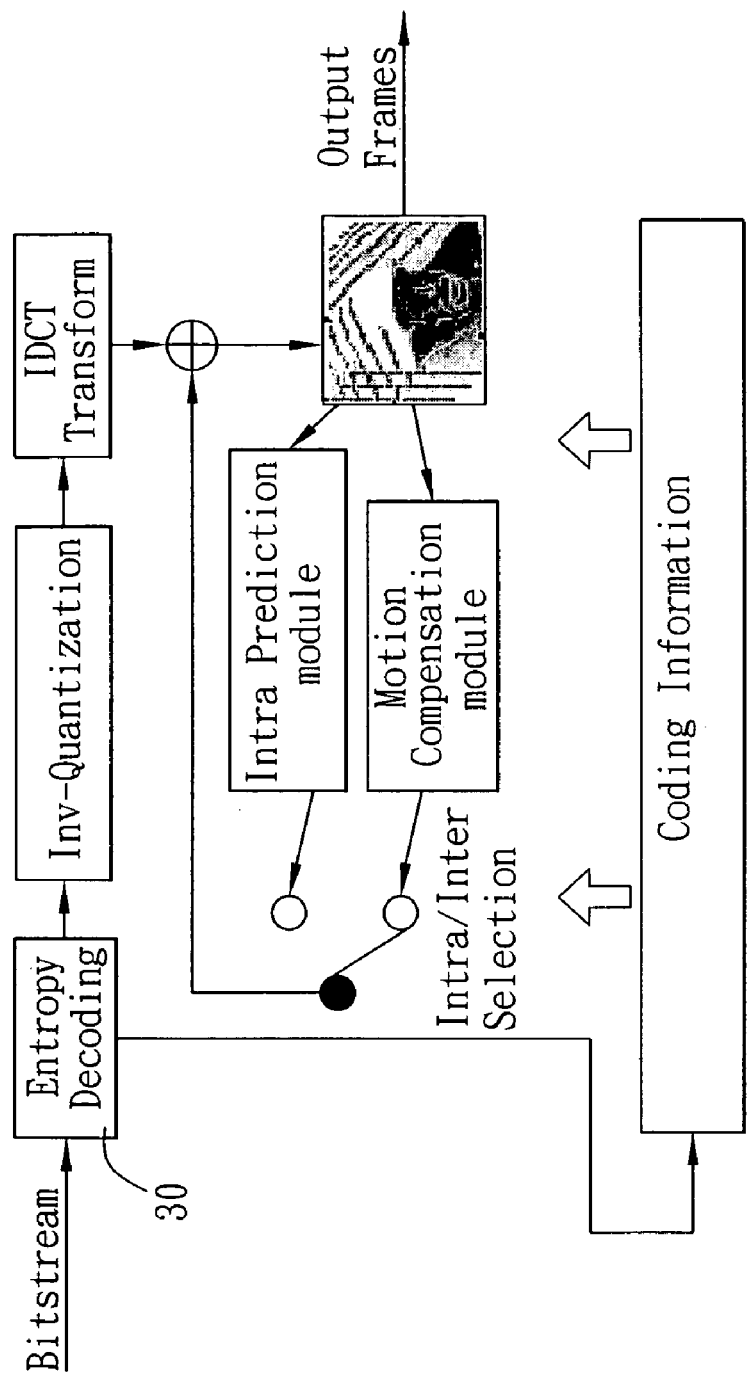
FIG. 3 is a block diagram of a MC/DCT video decoder.
Figure 4:
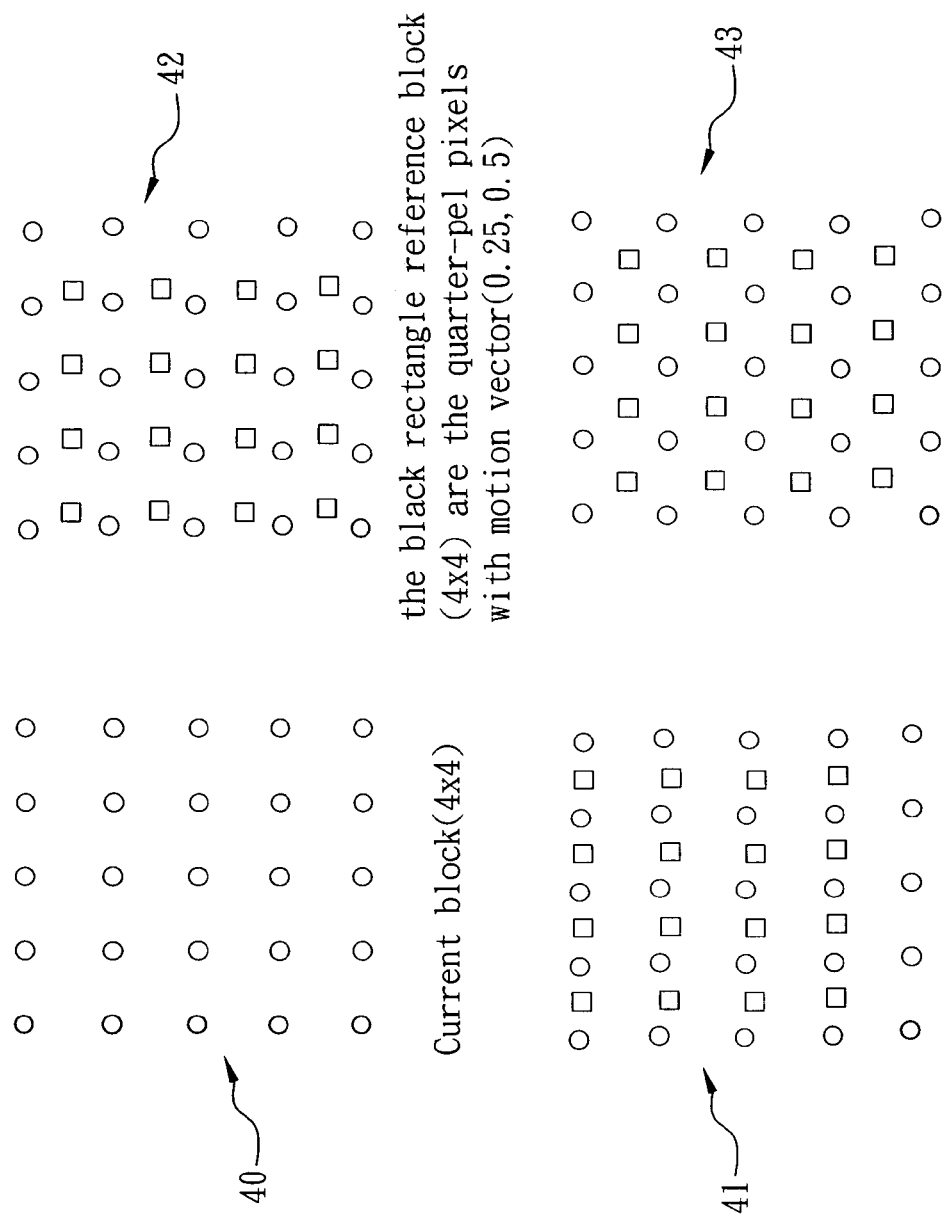
FIG. 4 is a schematic view of a current block along with several prediction blocks.
Figure 5:
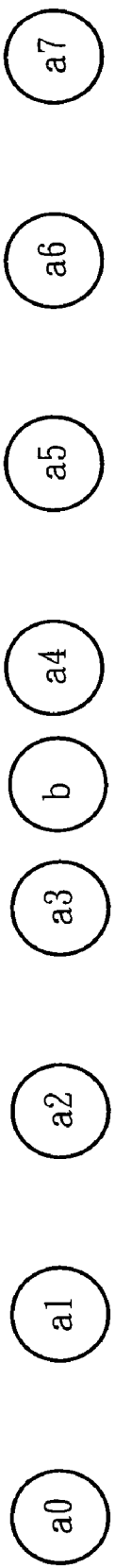
FIG. 5 is a schematic view of eight pixel values a0, a1, a2, a3, a4, a5, a6 and a7 inputted to an interpolation filter.
Figure 6:
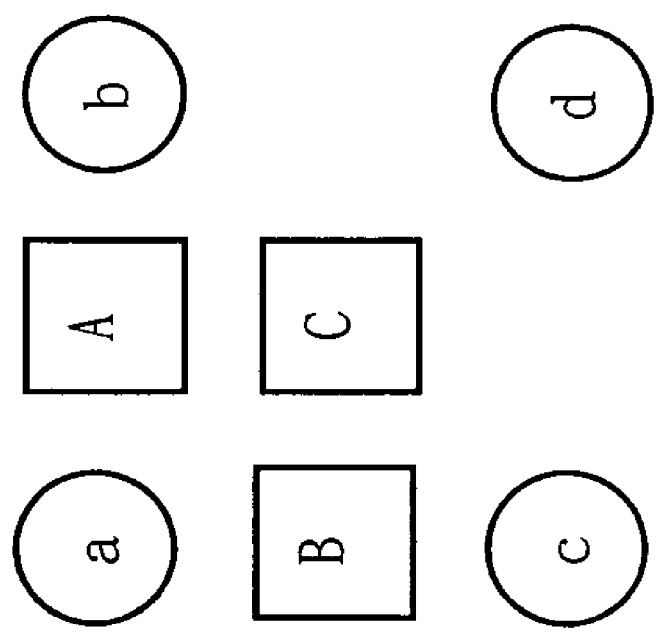
FIG. 6 is a schematic view of pixels filtered by a bilinear interpolation filter.
Figure 10:
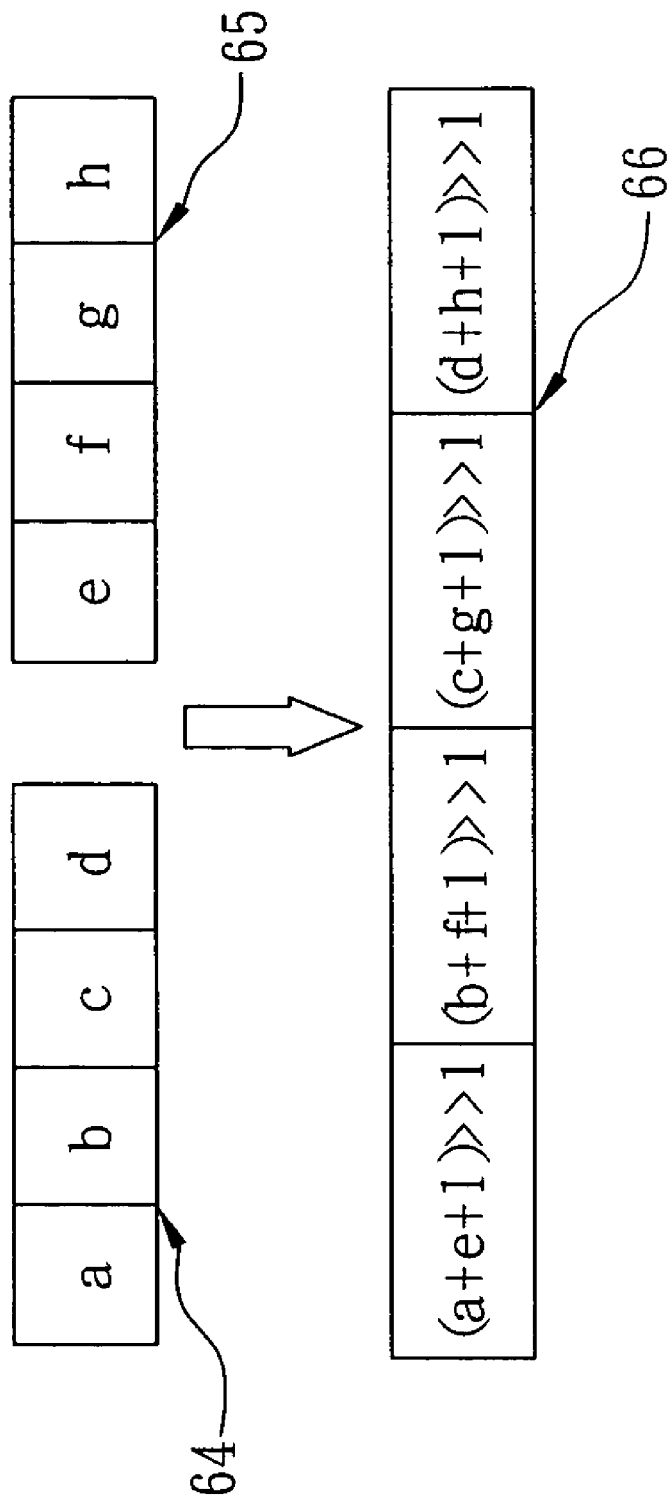
FIG. 10 is a schematic view of process of a bilinear filter.

In a bilinear filter, referring to FIG. 10, when input data words 64, 65 are 32-bit data words, and each of them comprises four packed pixel values a, b, c and d (or e, f, g and h) and has a limited range [0, 255]. The results of the bilinear filter will be the data word 66 which has a limited range [0, 255]. Let AA, BB and CC denote the data words 64, 65 and 66 separately, then the relationships between AA, BB and CC are represented as follows:

$$CC = (AA|BB) - (((AA\char`\^BB) >> 1) \& 0x7f7f7f7f)$$

Figure 11:
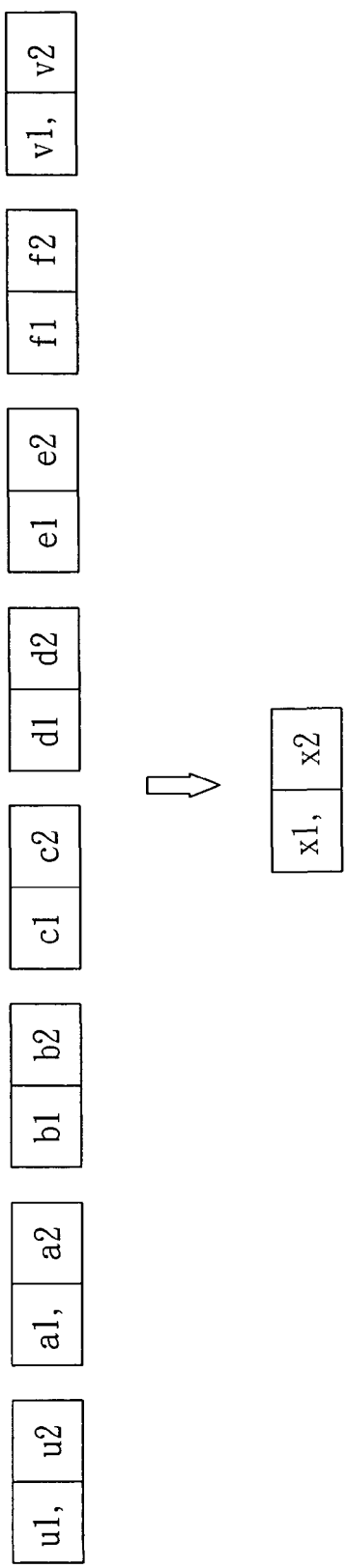
FIG. 11 is a schematic view of process of a complex filter.

In a complex filter, referring to FIG. 11, when input data words (u1, u2), (a1, a2), (b1, b2), (c1, c2), (d1, d2), (e1,e2), (f1, f2) and (v1, v2) are 32-bit data words, and each of them comprises two packed pixel values and has a limited range [0, 255]. The result of the complex filters will be the data word (x1, x2) which comprises two packed pixel values and has a limited range [0, 255]. Again referring to FIG. 11, if the complex filter is a MPEG-4 ASP interpolation filter, the low two bytes and high two bytes of the data word (x1, x2) should have the values as follows:

$tmp=(-u1+3 \times a1-6 \times b1+20 \times c1+20 \times d1-6 \times e1+3 \times f1-v1+16)>>5$ $x1=\text{clip0\_255}(tmp)$ $tmp=(-u2+3 \times a2-6 \times b2+20 \times c2+20 \times d2-6 \times e2+3 \times f2-v2+16)>>5$ $x2=\text{clip0\_255}(tmp)$ Again referring to FIG. 11, if the complex filter is a H.264 interpolation filter, the low two bytes and the high two bytes of the data word (x1, x2) are represented as follows:

$tmp=(a1-5 \times b1+20 \times c1+20 \times d1-5 \times e1+f1+16)>>5$ $x1=\text{clip0\_255}(tmp)$ $tmp=(a2-5 \times b2+20 \times c2+20 \times d2-5 \times e2+f2+16)>>5$ $x2=\text{clip0\_255}(tmp)$ Again referring to FIG. 11, if the complex filter is a VC-1 interpolation filter, the low two bytes and the high two bytes of the data word 33 are represented as follows:

$tmp=(-b1+9 \times c1+9 \times d1-e1+8)>>4$ $x1=\text{clip0\_255}(tmp)$ $tmp=(-b2+9 \times c2+9 \times d2-e2+8)>>4$ $x2=\text{clip0\_255}(tmp)$ In order to improve the efficiency of an interpolation filter for filtering data stream of video displaying on an electronic video apparatus without occupying valuable resource of instruction bit space within data processing system architecture and increasing the complexity, cost, size and power consumption of the circuitry of the electronic video apparatus, the present invention provides a method of parallelly filtering input data words containing a plurality of packed input data pixels to obtain final output data words containing packed half-pel pixels, which is implemented to an interpolation filter and comprises a first part for separating coefficients of the interpolation filter into two sets and a second part for clipping and shifting the data word obtained from the first part.

In the first part of the method, the coefficients of the interpolation filter are separated into the following two sets:
1) The first set comprises and only comprises the positive coefficients, for example, {1, 20, 20, 1} in a H.264 interpolation filter, {3, 20, 20, 3} in a MPEG-4 ASP filter, and {9, 9} in a VC-1 filter; and
2) The second set comprises and only comprises the negative coefficients, for example, {−5, −5} in the H.264 interpolation filter, {−1, −6, −6, −1} in the MPEG-4 ASP filter, and {−1, −1} in the VC-1 filter.

Figure 12:
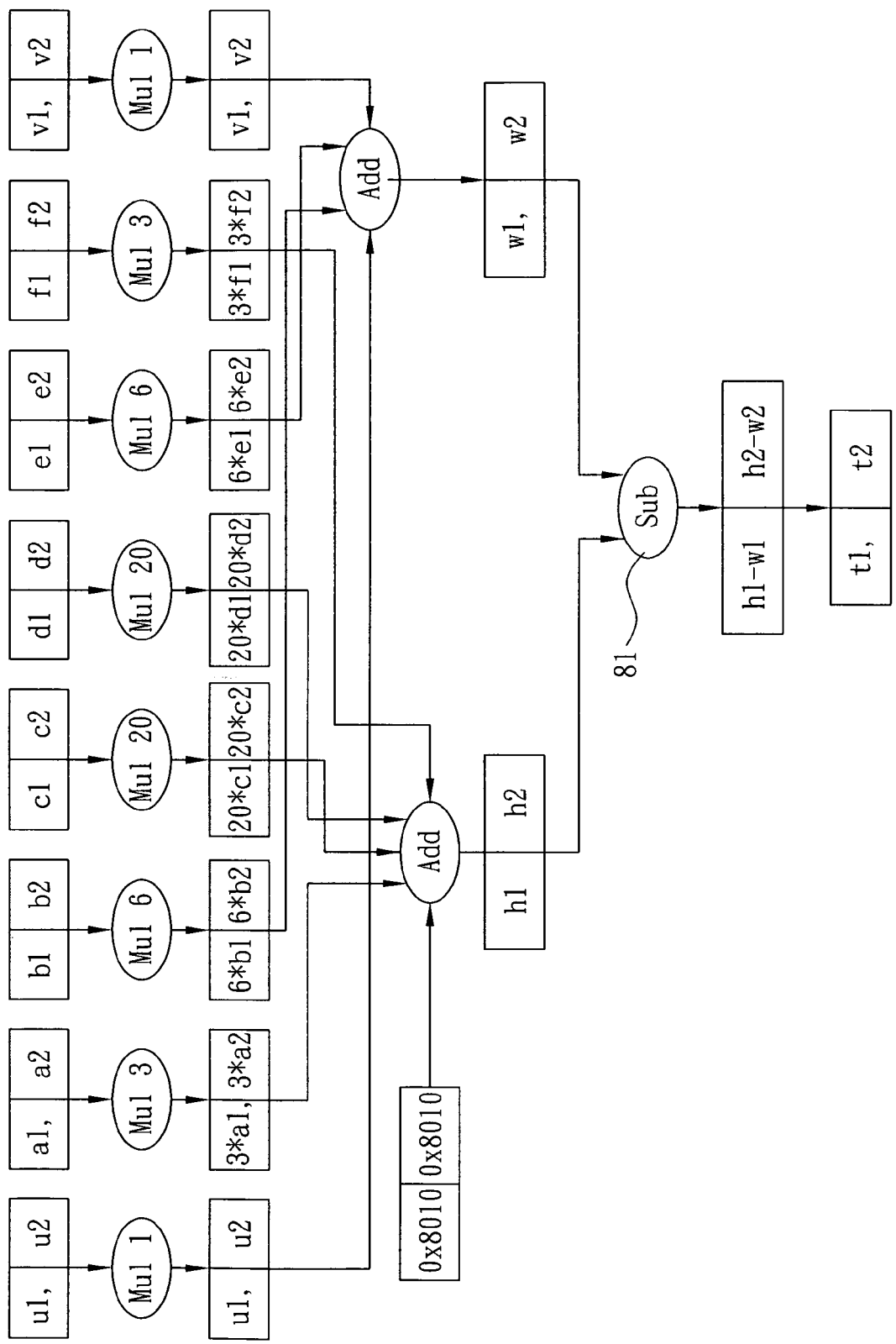
FIG. 12 is a schematic view of the first part of the method implemented to a first preferred embodiment of the present invention.

Thus, two groups of pixels packed into the input data words are filtered by the interpolation filter concurrently. Referring to FIG. 12, it illustrates the first part of a first preferred embodiment by implementing the method to a MPEG-4 ASP interpolation filter, each of the 32-bit input data words (u1, u2), (a1, a2), (b1, b2), (c1, c2), (d1, d2), (e1, e2), (f1, f2) and (v1, v2) contains two pixels to be processed. The first part of the first preferred embodiment comprises the following procedures:

(101). The input data words (a1, a2), (c1, c2), (d1, d2) and (f1, f2) to be multiplied by positive filter coefficients are multiplied by the correspond coefficients {3, 20, 20, 3} and are accumulated together to produce a first intermediate data word. Then, adding a first constant data word 0x80108010, which is the sum of the rounding offset 0x00100010 and the 0x80008000 that is used to stop the interaction between the two groups packed pixels to be filtered, with the first intermediate data word to obtain a second intermediate data word (h1, h2);

(102) The input data words (u1, u2), (b1, b2), (e1, e2), and (v1, v2) to be multiplied by negative filter coefficients are multiplied by the inverse of their corresponding coefficients {−1, −6, −6, −1} and accumulated together to obtain a third intermediate data word (w1, w2); and (103) A first subtraction operation 81 is performed for subtracting the third intermediate data word (w1, w2) from the second intermediate data word (h1, h2) to obtain a first result data word (t1, t2), which is then outputted to the second part of the first preferred embodiment.

Figure 13:
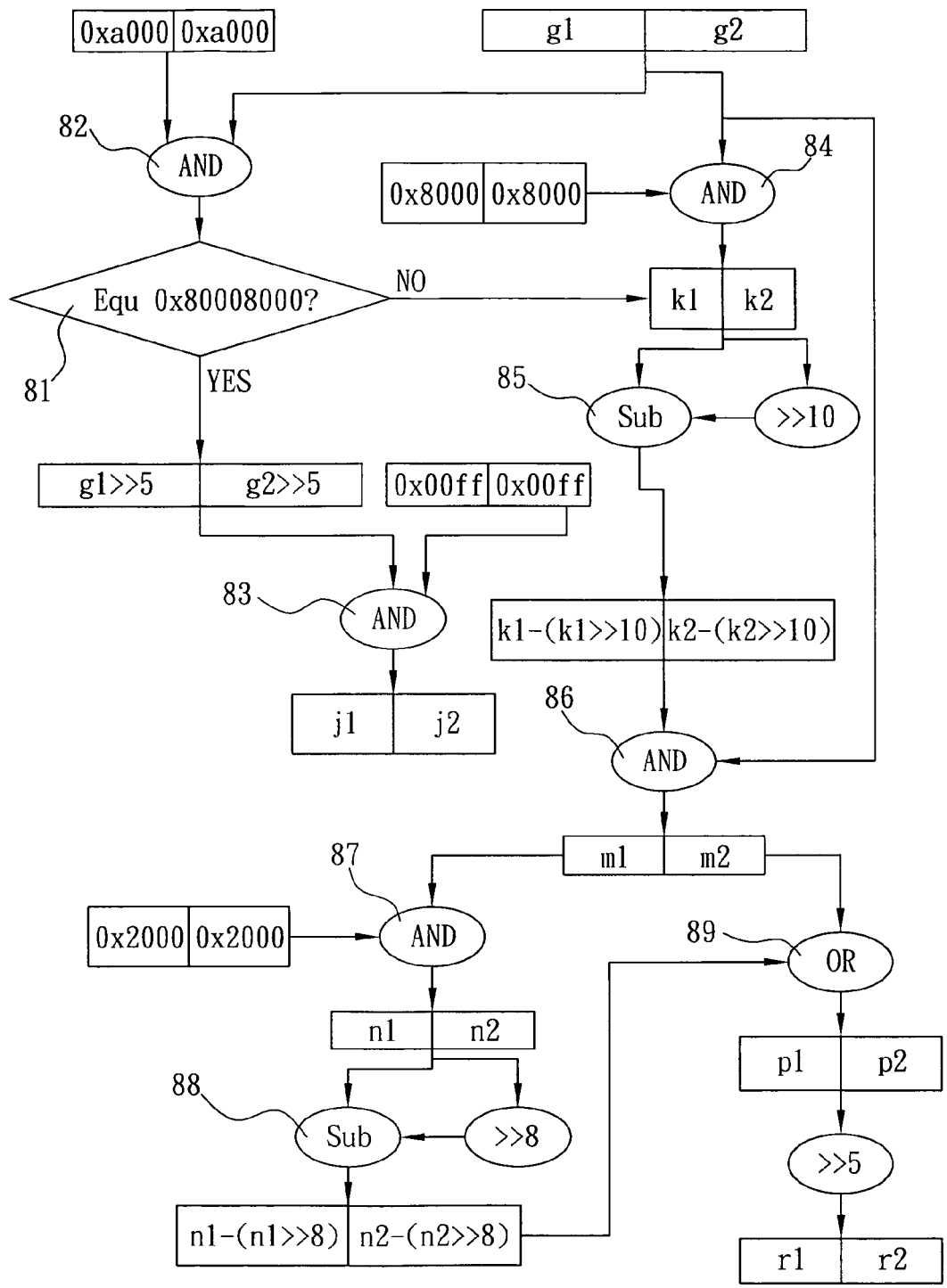
FIG. 13 is a schematic view of the second part of the method implemented to the first preferred embodiment of the present invention.

Referring to FIG. 13, it illustrates the second part of the first preferred embodiment, which comprises the procedures as follows:

(104) A first AND logical operation 82 is performed between a second constant data word 0xa000a000 and the first result data word (g1, g2) to obtain a fourth intermediate data word, the fourth intermediate data word is then compared with a constant value 0x80008000 for determining whether or not the fourth intermediate data word is equal to the constant value 0x80008000; when the determination is positive, go to step (105); otherwise, go to step (106)

(105) A second AND logical operation 83 is performed between the constant value 0x00ff00ff and the first result data word (g1, g2) right shifting by five bit position to obtain a final output data word (j1, j2).

(106) A third AND logical operation 84 is performed between the first result data word (g1, g2) and the constant data word 0x80008000 to obtain a fifth intermediate data word (k1, k2);

(107) A second subtraction operation 85 is performed for subtracting the fifth intermediate data word (k1, k2) right shifting by ten bit position from the fifth intermediate data word (k1, k2) to obtain a first mask data word (k1−(k1>>10), k2−(k2>>10));

(108) A fourth AND logical operation 86 is performed between the first mask data word (k1−(k1>>10), k2−(k2>>10)) and the first result data word (g1, g2) as the clipping down operation to obtain a second result data word (m1, m2);

(109) A fifth AND logical operation 87 is performed between the second result data word (m1, m2) and the third constant data word 0x20002000 to obtain a sixth intermediate data word (n1, n2);

(110) A third subtraction operation 88 is performed for subtracting the sixth intermediate data word (n1, n2) right shifting by eight bit position from the sixth intermediate data word (n1, n2) to obtain a second mask data word (n1−(n1>>8), n2−(n2>>8)); and (111) An OR logical operation 89 is performed between the second mask data word (n1−(n1>>8), n2−(n2>>8)) and the second result data word (m1, m2) to obtain a data word (p1, p2), and then right shifting the data word (p1, p2) by five bit position to obtain a final output data word (r1, r2). Thus, according to the first embodiment, the final data word (j1, j2) or (r1, r2) is obtained as the exact packed half-pel pixels by using the MPEG-4 half-pel interpolation filter when the integer-pel pixels are packed into the input data words (u1, u2), (a1, a2), (b1, b2), (c1, c2), (d1, d2), (e1, e2), (f1, f2) and (v1, v2).

Figure 14:
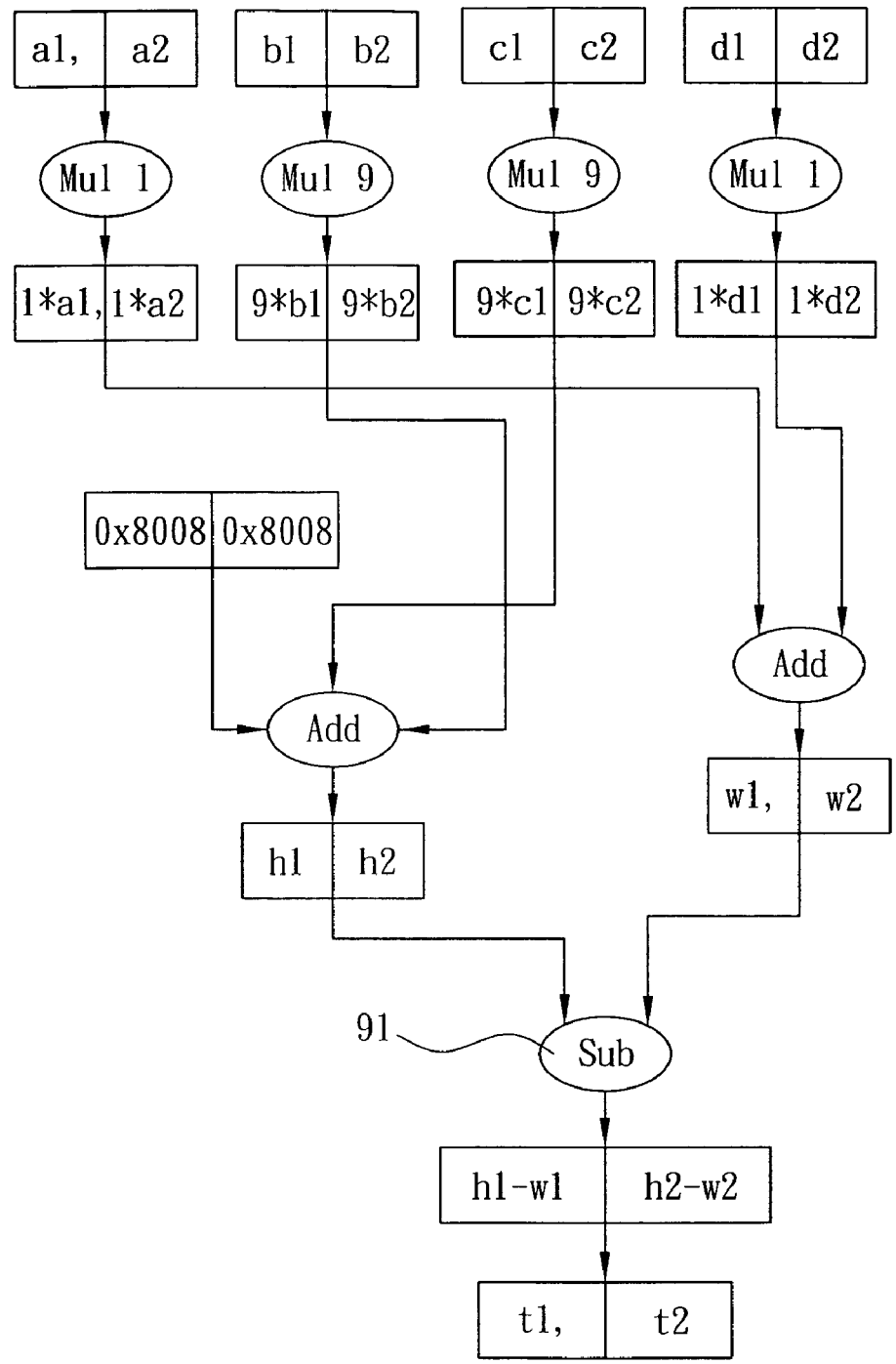
FIG. 14 is a schematic view of the first part of the method implemented to a second preferred embodiment of the present invention.

In a second preferred embodiment of the invention, as referring to FIG. 14, the method is implemented to a VC-1 interpolation filter, of which the input data words (a1, a2), (b1, b2), (c1, c2) and (d1, d2) contains two pixels to be processed and the first part of the second preferred embodiment comprises the following procedures:

(301) The input data words (b1, b2) and (c1, c2) to be multiplied by positive filter coefficients are multiplied by the correspond coefficients {9, 9} and are accumulated together with the data word 0x80108010 to obtain the data word (h1, h2); and (302) The input data words (a1, a2) and (d1, d2) to be multiplied by negative filter coefficients are multiplied by the inverse of their corresponding coefficients {−1, −1} and accumulated together to obtain the data word (w1, w2); and (303) A first subtraction operation 91 is performed for subtracting the data word (w1, w2) from the data word (h1, h2) to obtain a first result data word (t1, t2), which is then outputted to the second part of the second preferred embodiment.

Figure 15:
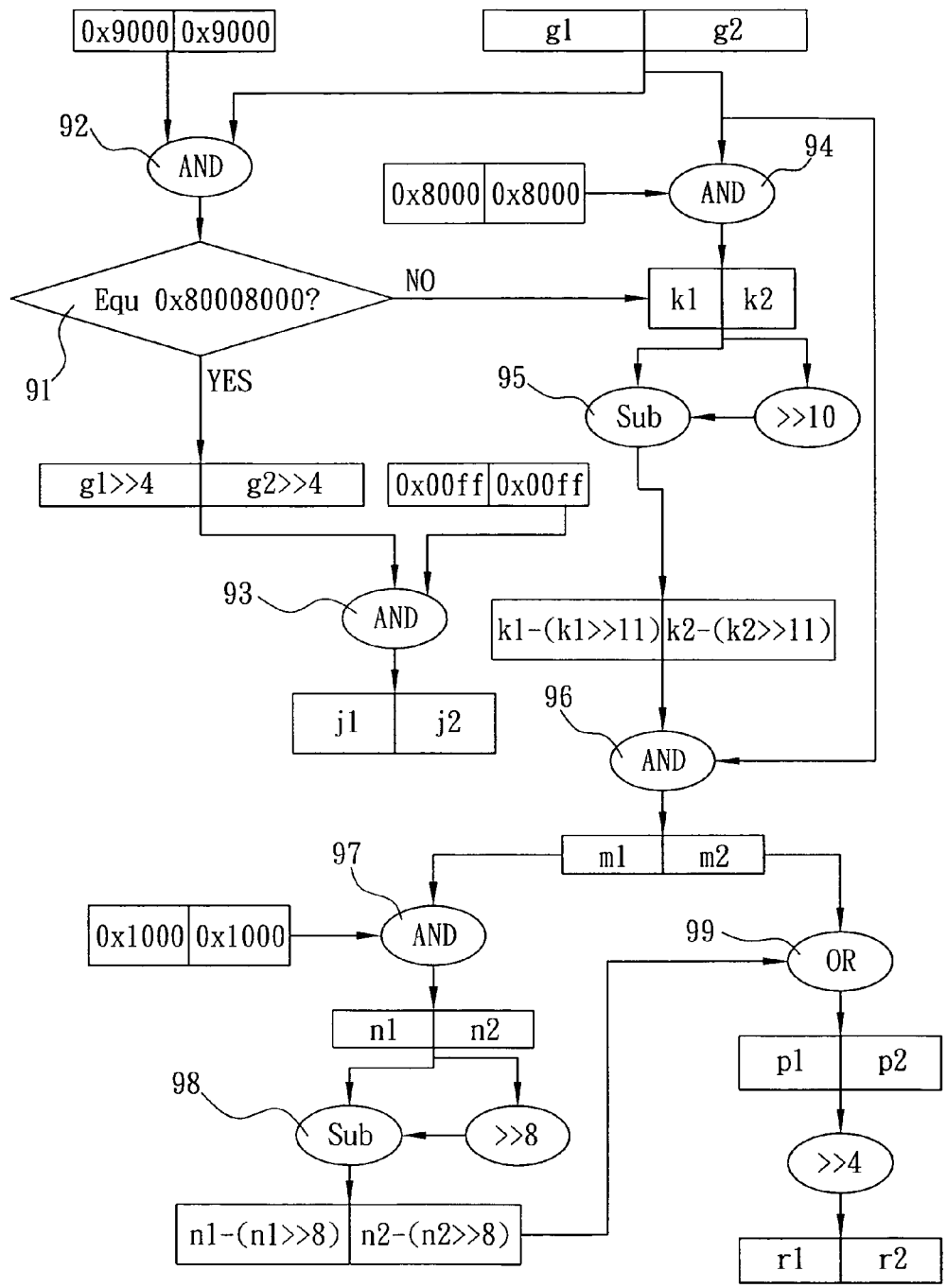
FIG. 15 is a schematic view of the second part of the method implemented to the second preferred embodiment of the present invention.

Referring to FIG. 15, it illustrates the second part of the second preferred embodiment, which comprises the procedures as follows:

(304) A first AND logical operation 92 is performed between constant value 0x90009000 and the first result data word (g1, g2), the result of the AND logical operation is compared with a constant value 0x80008000 for determining whether or not the result is equal to the constant value 0x80008000; when the determination is positive, go to step (305); otherwise, go to step (306)

(305) A second AND logical operation 93 is performed between the constant value 0x00ff00ff and the first result data word (g1, g2) right shifting by four bit position to obtain a final output data word (1, j2).

(306) A third AND logical operation 94 is performed between the first result data word (g1, g2) and the constant data word 0x80008000 to obtain a data word (k1, k2);

(307) A second subtraction operation 95 is performed for subtracting the data word (k1, k2) right shifting by eleven bit position from the data word (k1, k2) to obtain a first mask data word (k1−(k1>>11), k2−(k2>>11));

(308) A fourth AND logical operation 96 is performed between the first mask data word (k1−(k1>>11), k2−(k2>>11)) and the first result data word (g1, g2) as the clipping down operation to obtain a second result data word (m1, m2);

(309) A fifth AND logical operation 97 is performed between the data word (m1, m2) and the constant word 0x10001000 to obtain a data word (n1, n2);

(310) A third subtraction operation 98 is performed for subtracting the data word (n1, n2) right shifting by eight bit position from the data word (n1, n2) to obtain a second mask data word (n1−(n1>>8), n2−(n2>>8)); and (311) An OR logical operation 99 is performed between the second mask data word (n1−(n1>>8), n2−(n2>>8)) and the second result data word (m1, m2) to obtain a data word (p1, p2), and then right shifting the data word (p1, p2) by four bit position to obtain a final output data word (r1, r2). According to the second embodiment, the final data word (j1, j2) or (r1, r2) is obtained as the exact packed half-pel pixels by using the VC-1 half-pel interpolation filter when the integer-pel pixels are packed into the input data words (a1, a2), (b1, b2), (c1, c2) and (d1, d2).

Summing up the above, it is apparent that the method of the invention is also capable of being implemented to a H.264 interpolation filter or other interpolation filters for parallelly filtering input data words containing a plurality of packed input data pixels to obtain final output data words containing packed half-pel pixels so as to efficiently filter data stream of video without increasing the complexity, cost, size and power consumption of the circuitry of the electronic video apparatus concerned.

While the invention herein disclosed has been described by means of specific embodiments, numerous modifications and variations could be made thereto by those skilled in the art without departing from the scope and spirit of the invention set forth in the claims.

What is claimed is:

1. A parallel filtering method, which is implemented to an interpolation filter embedded in an electronic video apparatus on executable memory, comprising the steps:

performing on a first circuit the steps:

separating coefficients of the interpolation filter into two sets comprising positive and negative coefficients respectively for parallelly filtering a plurality of input data pixels packed into data words inputted to the interpolation filter concurrently;

multiplying the data words with absolute values of the positive and negative coefficients respectively;

accumulating all the data words multiplied by the absolute values of the positive coefficients to produce a first intermediate data word, and adding a first constant data word denoting the sum of rounding offset and 0x80008000 to the first intermediate data word to obtain a second intermediate data word;

accumulating all the data words multiplied by the absolute values of the negative coefficients to obtain a third intermediate data word;

subtracting the third intermediate data word from the second intermediate data word to obtain a first result data word; and performing on a second circuit the steps:

performing a first AND logical operation between the first result data word and a second constant data word to obtain a fourth intermediate data word;

determining whether or not the fourth intermediate data word is equal to 0x80008000;

when it is determined that the fourth intermediate data word does not equal 0x80008000, performing a second AND logical operation between the first result data word and 0x80008000 to obtain a fifth intermediate data word;

subtracting the fifth intermediate data word right shifting by a first predetermined bit position from the fifth intermediate data word to obtain a first mask data word;

performing a third AND logical operation between the first mask data word and the first result data word to obtain a second result data word;

performing a fourth AND logical operation between the second result data word and a third constant data word to obtain a sixth intermediate data word;

subtracting the sixth intermediate data word right shifting by a second predetermined bit position from the sixth intermediate data word to obtain a second mask data word; and performing an OR logical operation between the second mask data word and the second result data word and then right shifting the result thereof by a third predetermined bit position to obtain a final output data word outputted through the electronic video apparatus.

* * * * *